United States Patent
Hachisuka et al.

(10) Patent No.: US 6,479,988 B2
(45) Date of Patent: Nov. 12, 2002

(54) METHOD AND APPARATUS FOR TESTING THIN-FILM MAGNETIC HEAD

(75) Inventors: Nozomu Hachisuka; Katsuhiko Tomita, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/866,763

(22) Filed: May 30, 2001

(65) Prior Publication Data

US 2001/0048303 A1 Dec. 6, 2001

(30) Foreign Application Priority Data

Jun. 6, 2000 (JP) .................................... 2000-168435

(51) Int. Cl.[7] .......................... G01R 33/12; G11B 5/455
(52) U.S. Cl. ............................. 324/210; 29/593; 29/235
(58) Field of Search ........................... 324/210, 211, 324/212, 232, 235; 29/593; 327/39

(56) References Cited

U.S. PATENT DOCUMENTS 5,721,488 A    2/1998  Sakai et al. ................. 324/210
5,854,554 A  * 12/1998  Tomita et al. ............... 324/210
5,936,789 A  *  8/1999  Mukohara ..................... 360/75

FOREIGN PATENT DOCUMENTS

JP          6-150264         5/1994

* cited by examiner

Primary Examiner—Jay Patidar
(74) Attorney, Agent, or Firm—Burns, Doane, Swecker & Mathis, L.L.P.

(57) ABSTRACT

A method for testing a thin-film magnetic head with a MR read head element includes a step of applying a low-frequency or DC external magnetic field to the thin-film magnetic head from a stationary magnetic field generation unit, a step of executing a high-frequency amplification of an output from the MR read head element under the application of the external magnetic field to provide a high-frequency amplified signal, a step of deriving only a high-frequency component from the high-frequency amplified signal to provide a high-frequency component signal, and a step of judging whether the thin-film magnetic head occurs a noise or not by using the high-frequency component signal.

8 Claims, 11 Drawing Sheets

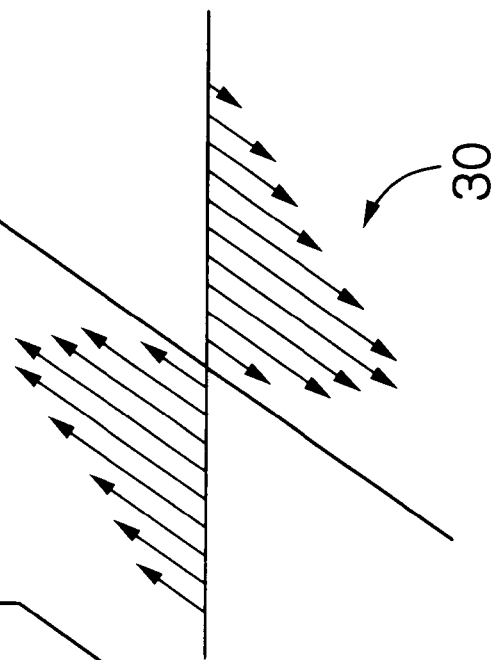
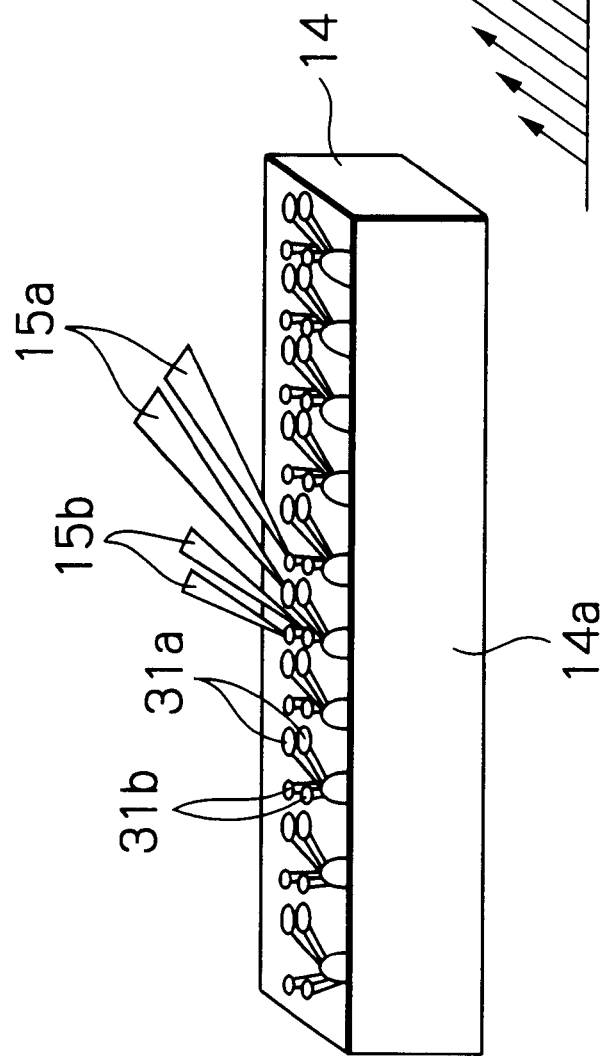
Fig. 3a
Fig. 3b

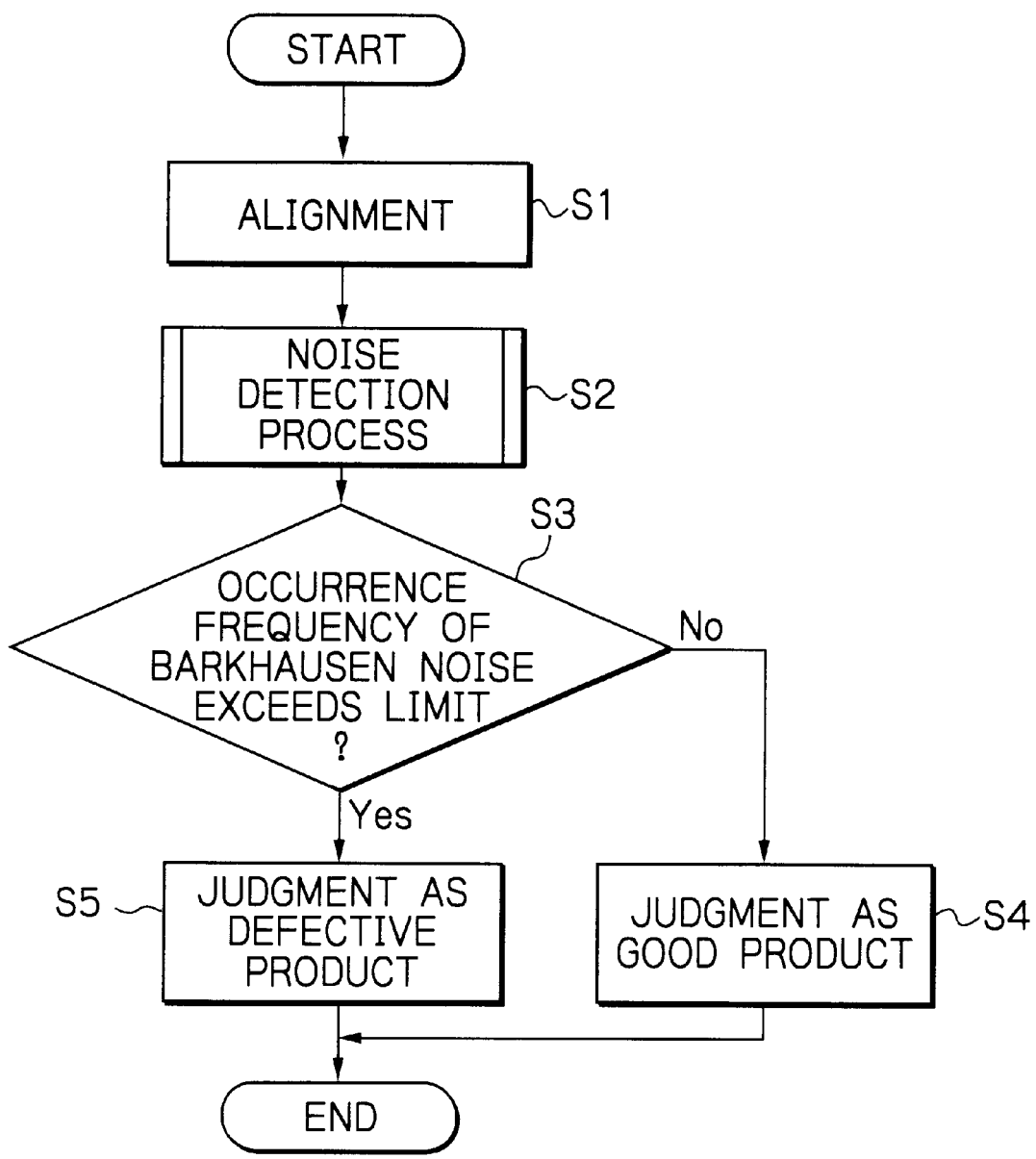

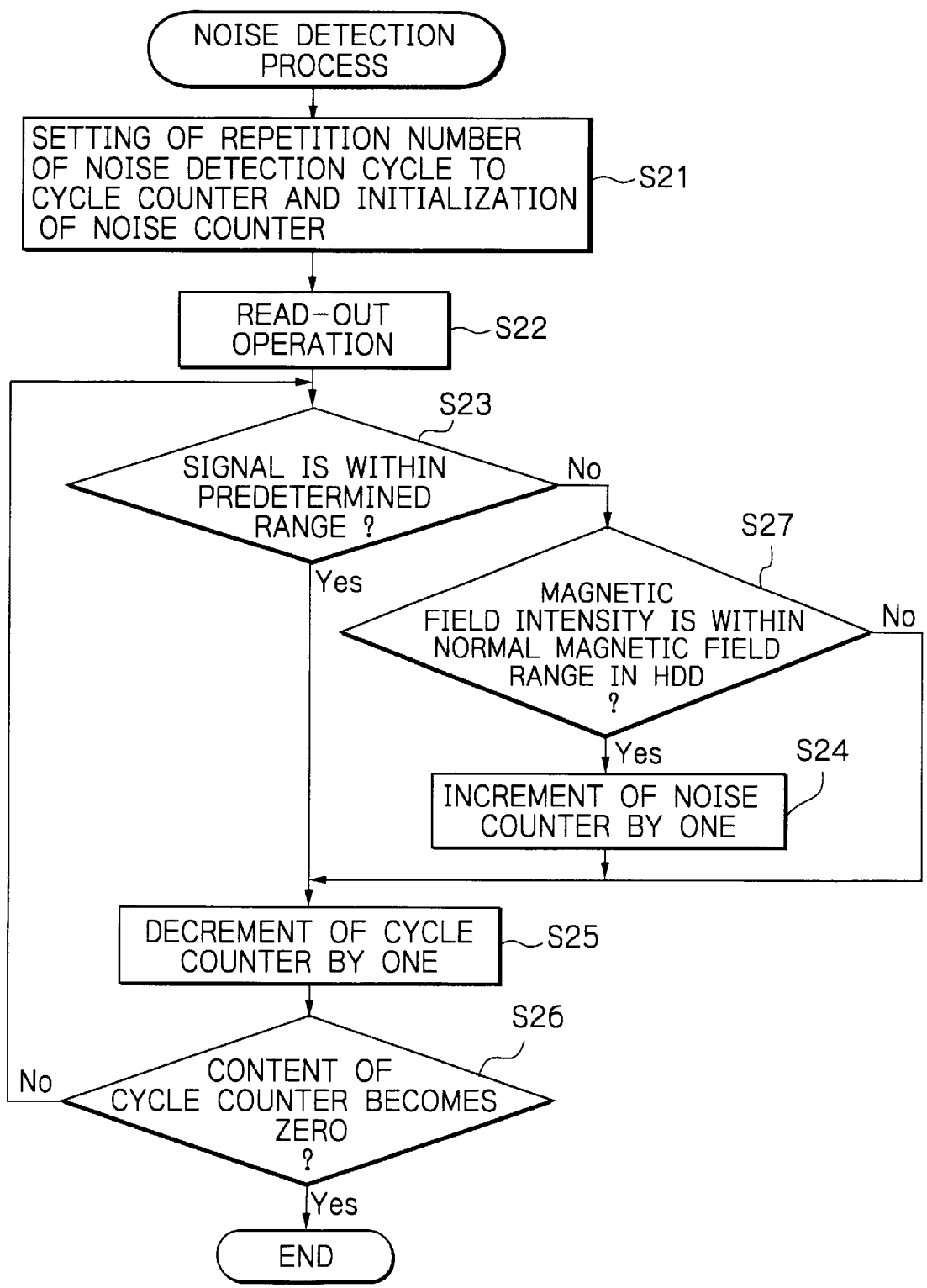

METHOD AND APPARATUS FOR TESTING THIN-FILM MAGNETIC HEAD

FIELD OF THE INVENTION

The present invention relates to a method and apparatus for testing a thin-film magnetic head having at least magnetoresistive effect (MR) read head element.

DESCRIPTION OF THE RELATED ART

Recently, it has been requested to improve performance of a thin-film magnetic head so as to satisfy increased recording density in a hard disk drive (HDD) unit. Therefore, a composite thin-film magnetic head with an inductive write head element and a MR read head element layered on the inductive write head element has been broadly utilized instead of an inductive read/write head.

Now, a thin-film magnetic head with a giant magnetoresistive effect (GMR) element such as a spin-valve MR element or with a tunnel magnetoresistive effect (TMR) element has been developed to more increase magnetic recording density, instead of a usual thin-film magnetic head with an anisotropic magnetoresistive effect (AMR) element.

At each test after manufacturing a thin-film magnetic head, it is necessary to confirm that the finished magnetic head with a MR element such as an AMR element, a GMR element and a TMR element may not produce any inherent noise such as Barkhausen noise.

Japanese Patent Publication 06150264 A1 of the same assignee as that of the present application discloses a MR head testing method. In this testing method, an external alternating magnetic field is applied, in a direction perpendicular to an Air Bearing Surface (ABS), to a plurality of MR thin-film magnetic heads which are aligned on a head block and are mechanically processed to control their gap-depth, and electromagnetic transfer characteristics ($\rho$-H characteristics) of each of the MR thin-film magnetic heads under the varying external magnetic field is measured.

U.S. Pat. No. 5,721,488 of the same assignee as that of the present application discloses an improved MR head testing method. In this latter testing method, alternating leakage magnetic field of a radio frequency, excited by a write current flowing through an inductive element is applied to the MR element in addition to external alternating magnetic field which is applied to the MR element in a direction perpendicular to the ABS of the head block, and $\rho$-H characteristics of each of the MR thin-film magnetic heads under the varying external and leakage magnetic fields is measured. By means of this testing method disclosed in the U.S. patent, since the applied leakage magnetic fields due to the write current will induce unstable state of the MR element, possible Barkhausen noise can be detected with a high probability.

However, in all conventional Barkhausen noise detection methods including the aforementioned testing methods, it is judged whether Barkhausen noise occurs or not by using measured result of $\rho$-H characteristics of the MR head element.

The measurement of $\rho$-H characteristics would be executed by using a low-frequency measurement device called as a $\rho$-H tester. In normal, whether Barkhausen noise occurs or not was judged by observing possible jump or hysteresis loop of the measured $\rho$-H shape.

However, according to these known testing methods of measuring $\rho$-H characteristics, it was very difficult to reliably detect whether Barkhausen noise is occurred or not because (1) the Barkhausen noise is not always visible, (2) a high speed noise may be temporarily produced but not continued, and (3) the shape of the noise is changed depending upon the intensity of the external magnetic field.

It may be effective to increase a possibility of occurrence of Barkhausen noise by forcefully applying before measurement to the head a strong magnetic field due to a large write current so as to change its basic state. However, impressing of a stress which will not ordinarily happen in the HDD to the magnetic head is undesirable. In order to surely detect the Barkhausen noise, it is desired that the measurement be executed under application of magnetic field as large as the produced magnetic field in the magnetic head. However, such application of the magnetic field is impossible during one time measurement, and also if sampling speed is low, it will fail to detect the Barkhausen noise.

SUMMARY OF THE INVENTION

It is therefore an object of the present invention to provide a method and apparatus for testing a thin-film magnetic head, whereby easy and reliable detection of Barkhausen noise in a short time can be realized.

Another object of the present invention is to provide a method and apparatus for testing a thin-film magnetic head, whereby the detection of Barkhausen noise can be attained without applying a stress to the thin-film magnetic head.

According to the present invention, a method for testing a thin-film magnetic head with a MR read head element includes a step of applying a low-frequency or DC external magnetic field to the thin-film magnetic head from a stationary magnetic field generation unit, a step of executing a high-frequency amplification of an output from the MR read head element under the application of the external magnetic field to provide a high-frequency amplified signal, a step of deriving only a high-frequency component from the high-frequency amplified signal to provide a high-frequency component signal, and a step of judging whether the thin-film magnetic head occurs a noise or not by using the high-frequency component signal.

Also, according to the present invention, an apparatus for testing a thin-film magnetic head with a MR read head element includes a stationary magnetic field generation unit for applying a low-frequency or DC external magnetic field to the thin-film magnetic head, a high-frequency amplification circuit for amplifying an output from the MR read head element under the application of the external magnetic field to provide a high-frequency amplified signal, a high-pass circuit for deriving only a high-frequency component from the high-frequency amplified signal to provide a high-frequency component signal, and a judgment unit for judging whether the thin-film magnetic head occurs a noise or not by using the high-frequency component signal.

A known low frequency (10 kHz or less) or DC external magnetic field of a known intensity is applied to the thin-film magnetic head from a stationary magnetic field generation unit. Under the application of the external magnetic field, an output from the MR read head element is amplified by a high-frequency amplification circuit, and then only a high-frequency component is derived from the high-frequency amplified output. In the derived high-frequency component, no low-frequency variable component corresponding to the applied external magnetic field is existed and Barkhausen noise if it is existed is appeared in a differentiated waveform. Thus, from this derived high-frequency component, whether a noise occurs or not can be easily judged in a short time.

Further, since the output from the MR read head element is amplified by the high-frequency amplification circuit and the noise detection is performed using the high-frequency component derived from the high-frequency amplified output, it is possible to detect only high-speed changing characteristics of the MR element. In other words, it is possible to know high-speed behavior of the magnetic head, which could not be observed at all by using the ρ-H tester that is a low-frequency measurement equipment. Thus, detection of Barkhausen noise can be easily and reliably performed in a short time.

Furthermore, the detection of Barkhausen noise can be performed without applying magnetic stress to the thin-film magnetic head.

Since the external magnetic field applied to the magnetic head is that generated by the stationary magnetic field generation unit, no thermal noise and media noise is contained as the external magnetic field from the magnetic record media and therefore correct detection of Barkhausen noise can be expected.

Furthermore, since the external magnetic field intensity can be optionally adjusted by using the stationary magnetic field generation unit, it is possible to judge the safety when the magnetic head is assembled in the HDD, and also it is possible to obtain a jumped amount of Barkhausen noise. As a result, a ratio of the jumped amount with respect to the head output (S/N) can be obtained.

It is preferred that the judging step includes measuring the number of times that the high-frequency component signal exceeds a threshold, or that the judgment unit includes a comparison circuit for detecting that the high-frequency component signal exceeds a threshold to provide an output when detected, and a circuit for counting the number of the output provided from the comparison circuit. Since the output of the MR read head element is not sampled but amplified by the high-frequency amplification circuit and the derived high-frequency component is compared with the threshold, Barkhausen noise can be detected certainly without overlooking a momentary change of the output of the MR head element.

It is also preferred that the stationary magnetic field generation unit includes a unit for generating an alternating magnetic field with an intensity which corresponds to a level of an applied alternating current.

Preferably, an intensity of the external magnetic field applied from the stationary magnetic field generation unit is obtained at a time when it is judged that the thin-film magnetic head occurs a noise. For detecting Barkhausen noise, it is very important to know not only the existence of the noise but also a magnetic field intensity at which the Barkhausen noise will occur because of the aforementioned reason.

It is preferred that the method further includes a step of ignoring the judged occurrence of noise when the obtained intensity of the external magnetic field is out of a normal magnetic field range. Since the magnetic head cannot be specified that it will produce Barkhausen noise even under normal operation or under normal magnetic field, no counting of noise detection is executed at this time.

It is preferred that the method is performed for a plurality of thin-film magnetic head aligned on a head block.

Further objects and advantages of the present invention will be apparent from the following description of the preferred embodiments of the invention as illustrated in the accompanying drawings.

BRIEF DESCRIPTION OF THE DRAWINGS

FIG. 3a is an oblique view illustrating electrodes of the tested magnetic head on a head block and probe pins of the test apparatus;

FIG. 3b is a view illustrating external alternating magnetic field applied to the head block shown in FIG. 3a;

FIG. 4 is a flow chart schematically illustrating a part of control program of a computer shown in FIG. 1;

FIG. 11 is a flow chart illustrating in detail a Barkhausen noise detection process in a control program in another embodiment according to the present invention.

BRIEF DESCRIPTION OF THE DRAWINGS

Figure 1:
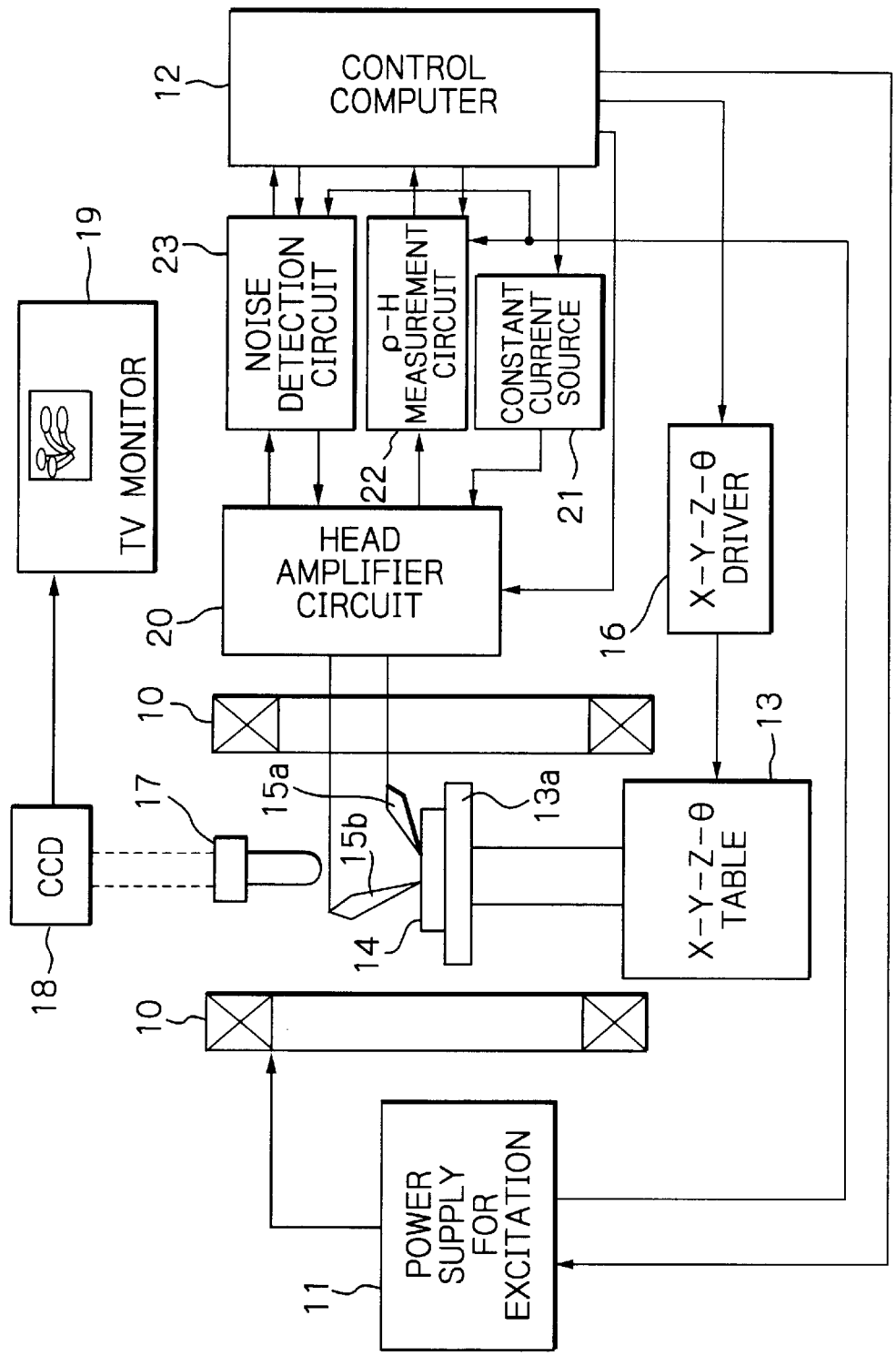
FIG. 1 is a block diagram schematically illustrating a circuit structure of a preferred embodiment of an apparatus for testing a thin-film magnetic head according to the present invention.

FIG. 1 schematically illustrates the embodiment of the apparatus for testing a thin-film magnetic head. This testing apparatus inspects occurrence of Barkhausen noise for a plurality of thin-film magnetic heads aligned on a head block (bar) and can be formed by modifying a ρ-H tester used for measuring ρ-H characteristics. Since many of components of the general ρ-H tester can be used in this testing apparatus, it is very easy to construct the apparatus.

In the figure, reference numeral 10 denotes a Helmholtz coil (air-core coil) for producing an external alternating magnetic field to be applied to a composite thin-film magnetic head including an inductive write head element and a MR read head element. In this embodiment, the Helmholtz coil 10 is arranged such that its longitudinal axis is vertically directed (up-down direction in the figure). A power supply 11 for providing excitation current to the Helmholtz coil 10 is electrically connected to the Helmholtz coil 10. This excitation power supply 11 is controlled by a control computer 12. In the Helmholtz coil 10, a platform 13a of a X-Y-Z-θ table 13 and a head block or bar 14 temporally fixed on the platform 13a are disposed.

The head block or bar 14 is an article in the manufacturing process of the thin-film magnetic heads and has a plurality of aligned composite thin-film magnetic heads that are not individually separated yet. Each of the composite magnetic heads has both an inductive write element and a MR read element. This head block 14 is provided by forming a large number of composite magnetic heads arranged in matrix on a wafer according to thin-film technology, by cutting the wafer into bar shaped blocks so that each block has the aligned magnetic heads, and by grinding an air bearing surface (ABS) 14a of the head block 14 so as to adjust gap-depth or MR-height of the heads.

First probe pins 15a are fixed at a standstill position and the head block 14 is aligned with the first probe pins 15a. This alignment is performed by the X-Y-Z-θ table 13 driven by the X-Y-Z-θ driver 16 so that the first probe pins 15a can electrically contact with output terminals 31a of the MR read element of the desired magnetic head formed on the head block 14, as illustrated in FIG. 3a. The alignment of the output terminals 31a with respect to the first probe pins 15a can be monitored by means of a CCD camera 18 which picks up image of this alignment portion via an optical system 17 such as an objective lens and by means of a TV monitor 19.

Second probe pins 15b are also fixed at a standstill position and the head block 14 is aligned with the second probe pins 15b. This alignment is also performed by the X-Y-Z-θ table 13 driven by the X-Y-Z-θ driver 16 so that the second probe pins 15b can electrically contact with input terminals 31b of the inductive write element of the desired magnetic head formed on the head block 14, as illustrated in FIG. 3a. The alignment of the input terminals 31b with respect to the second probe pins 15b also can be monitored by means of the CCD camera 18 and the TV monitor 19. In practice, the first and second probe pins 15a and 15b are integral with each other and thus the alignment of the these probe pins 15a and 15b with respect to the respective terminals 31a and 31b will be simultaneously performed.

FIG. 3a illustrates that the first probe pins 15a electrically contacts with the output terminals 31a of the MR element of the magnetic head to be tested and the second probe pins 15b electrically contacts with the input terminals 31b of the inductive element of the magnetic head to be tested.

As aforementioned, the second probe pins 15b are used for providing a write current to the inductive head element. However, for implementing the testing method of the present invention, since no write current is necessary to flow, the second probe pins 15b may be omitted.

The first probe pins 15a are electrically connected to a head amplifier circuit 20 for providing a sense current to the MR read head element and for executing high-frequency amplification of output voltage from the MR read head element. To the head amplifier circuit 20, a constant current source 21 for producing the sense current is electrically connected.

The head amplifier circuit 20 has a BHV (Buffered Head Voltage) output terminal for providing a DC amplified output (DC to a low frequency) that is used for measuring a DC resistance (DCMR) of the MR read head element. The BHV output terminal is electrically connected to a ρ-H measurement circuit 22 for measuring ρ-H characteristics of the head.

The head amplifier circuit 20 has another output terminal for providing a high-frequency output of one hundred kHz to several hundreds MHz. This another output terminal of is electrically connected to a high-frequency noise detection circuit 23 for detecting Barkhausen noise. To the noise detection circuit 23, the control computer 12 is electrically connected so as to judge whether occurrence frequency of Barkhausen noise is within a permitted range or not based upon the output of the noise detection circuit 23. This control computer 12 is also electrically connected with the ρ-H measurement circuit 22.

The head amplifier circuit 20, the power supply 11, the X-Y-Z-θ driver 16 and the constant current source 21 are further electrically connected to the control computer 12 so as to perform predetermined processes in response to commands from the computer 12.

Figure 2:
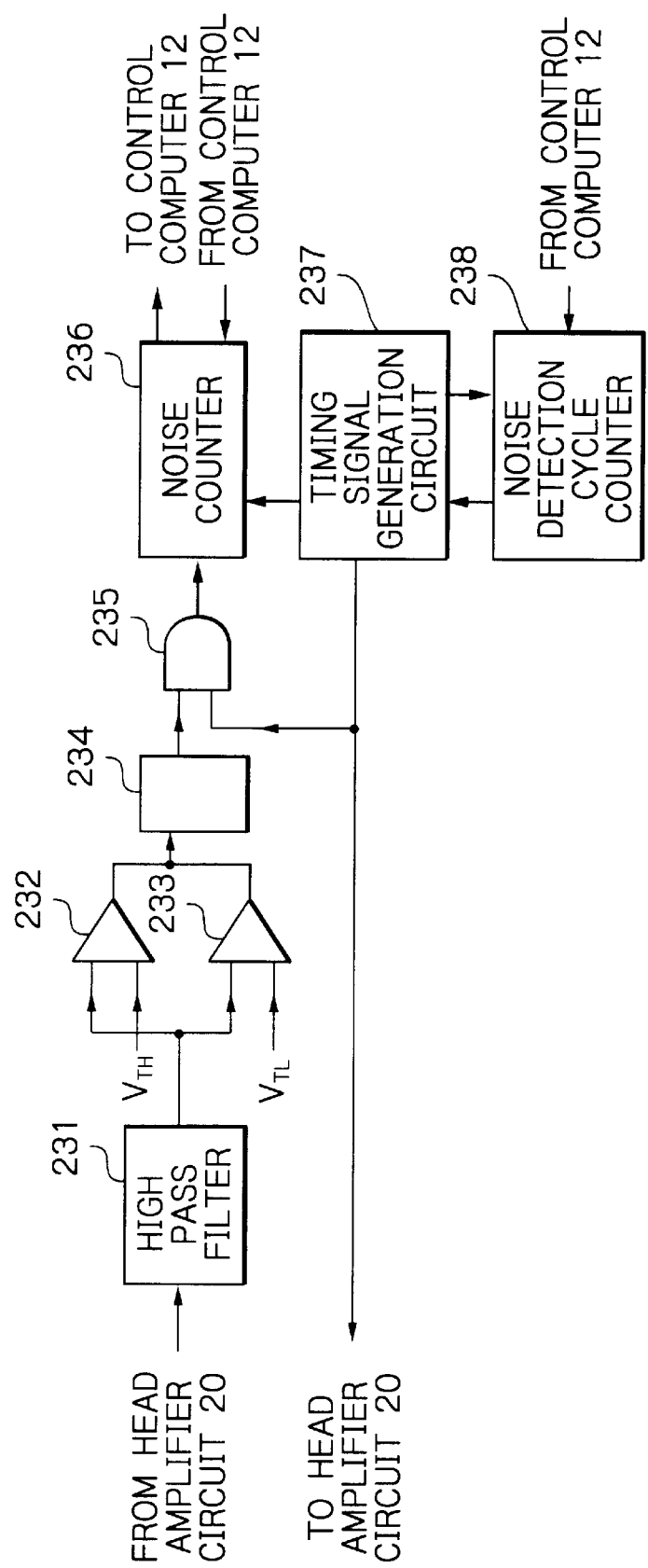
FIG. 2 is a block diagram schematically illustrating an example of a noise detection circuit shown in FIG. 1.

FIG. 2 schematically illustrates an example of the noise detection circuit 23.

In the figure, reference numeral 231 denotes a high pass filter for deriving only a high-frequency component from the output voltage of the MR read head element, amplified (high-frequency amplification) by the head amplifier circuit 20 and applied to the filter from the head amplifier circuit 20. An output terminal of the filter 231 is electrically connected to one input terminals of two comparators 232 and 233. To the other input terminal of the comparator 232, an upper threshold voltage $V_{TH}$ for discriminating Barkhausen noise is applied, whereas to the other input terminal of the comparator 233, a lower threshold voltage $V_{TL}$ for discriminating Barkhausen noise is applied. Output terminals of the comparators 232 and 233 are coupled to one input terminal of an AND circuit 235 via a pulse generation circuit 234 such as a mono-stable multi-vibrator.

The other input terminal of the AND circuit 235 is electrically connected to a timing signal generation circuit 237 so as to receive a read-out gate signal there from. An output terminal of the AND circuit 235 is electrically connected to an input terminal of a noise counter 236. The noise counter 236 is electrically connected with the timing signal generation circuit 237 so as to receive a timing signal there from. The noise counter 236 is also electrically connected to the control computer 12 so that its counted content is output to the computer 12.

The timing signal generation circuit 237 is electrically connected to a noise detection cycle counter 238 so as to output the read-out gate signal and the timing signal with reference to change in counted content of the counter 238.

FIG. 3b illustrates an external alternating magnetic field applied to the head block 14. This direction of the external magnetic field is the same direction as that of magnetic field applied to the magnetic head practically flying above a magnetic medium, namely is a direction perpendicular to the ABS 14a of the head block 14. Wave shape of the external magnetic field is, as shown by a reference numeral 30 in FIG. 3b, positively and negatively alternating sine wave in this embodiment. However, another wave shape may be optionally selected.

As is well known, the Helmholtz coil 10 generates a magnetic field with an intensity that is proportional to the applied excitation current in a direction along its longitudinal axis. Therefore, by directing magnitude and frequency of the excitation current to the excitation power supply 11, intensity and frequency of the applied magnetic field are freely controllable. The frequency of the applied magnetic field is a low frequency of 10 kHz or less. In this embodiment, for example, the magnetic field of 400 Hz is applied. If DC excitation current is applied plural times by changing its polarity, the Helmholtz coil 10 will generate an alternating magnetic field.

Referring to FIG. 4, which schematically illustrates a part of control program of the computer 12, the method of testing the composite thin-film magnetic head will be described in detail.

First, at step S1, alignment of the output terminals of the MR element of the magnetic head to be tested on the head block 14 which is fixed on the platform 13a of the X-Y-Z-θ table 13 with the first probe pin 15a, and if necessary alignment of the input terminals of the inductive element of the magnetic head with the second probe pin 15b are executed. This alignment will be performed by moving the X-Y-Z-θ table 13 by means of the X-Y-Z-θ driver 16 in accordance with instruction from the computer 12 using a well-known alignment technique.

Figure 5:
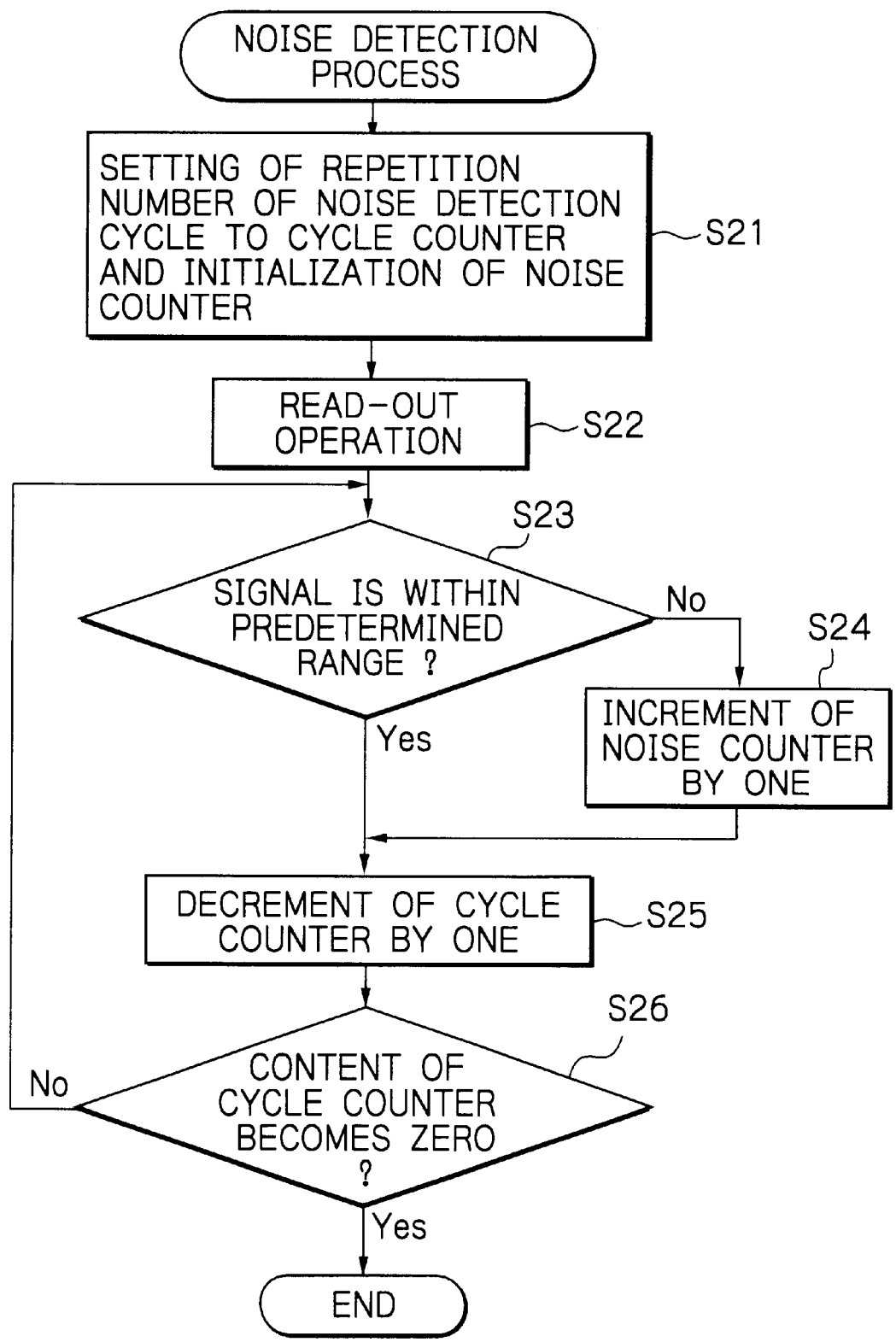
FIG. 5 is a flow chart illustrating in detail a flow of detecting an occurrence frequency of Barkhausen noise in the program shown in FIG. 4.

At step S2, then, an occurrence frequency of Barkhausen noise is detected by the noise detection circuit 23. FIG. 5 illustrates in detail this detection process at step S2.

First, at step S21, the number of repetition of noise detection is set in the noise detection cycle counter 238, and the noise counter 236 is reset by an initial value. The repetition number of the noise detection cycle will be appropriately determined, for example, to 100, 500, 5000 or other optional value.

Then, at step S22, read-out operation is executed by controlling the head amplifier circuit 20. This read-out operation will be performed, under application of a sense current to the MR read head element of the magnetic head, by applying a read-out gate signal which will be active during the read-out operation period from the timing signal generation circuit 237 in the noise detection circuit 23 to the head amplifier circuit 20 and to the AND circuit 235.

High-frequency amplification of the read-out voltage from the MR read head element is performed at the head amplifier circuit 20. The output voltage from the head amplifier circuit 20 is applied to the high pass filter 231 in the noise detection circuit 23 to derive only its high-frequency component. At step S23, a signal representing the derived high-frequency component from the filter 231 is applied to the comparators 232 and 233 and compared with the threshold voltages $V_{TH}$ and $V_{TL}$ to judged whether it is within a predetermined range or not.

If the high-frequency component signal is out of the predetermined range, a trigger signal output from the AND circuit 235 is applied to the noise counter 236 and thus content of this counter is incremented by one (step S24). Whereas if the high-frequency component signal is within the predetermined range, no trigger signal is output from the AND circuit 235 and thus the content of the noise counter 236 is not changed.

Then, at step S25, in response to the timing signal from the timing signal generation circuit 237, content of the noise detection cycle counter 238 is decremented by one.

Thereafter, at step S26, it is judged whether the content of the noise detection cycle counter 238 becomes zero or not. If it becomes zero, this detection process of occurrence frequency of Barkhausen noise is completed and the program proceeds to step S3 shown in FIG. 4. Otherwise, the above-mentioned sequences from step S22 are repeated.

When an output of a MR read head element containing Barkhausen noise is amplified by the high-frequency amplifier and then only its high-frequency component is derived, a low-frequency variable component corresponding to the applied external magnetic field is cut and only a part of the Barkhausen noise in a differentiated waveform is obtained. Therefore, if this high-frequency component signal is compared with the threshold voltages $V_{TH}$ and $V_{TL}$, the output of the comparator 232 or 233 is inverted and a trigger signal is provided from the pulse generation circuit 234 to count up the noise counter 236.

As will be noted from the above description, according to the detection process of FIG. 5, the occurrence frequency of Barkhausen noise, which represents how many times the Barkhausen noise occurred in the predetermined repetition number of the noise detection cycle can be obtained.

Thereafter, at step S3 shown in FIG. 4, it is judged whether the occurrence frequency of Barkhausen noise (occurrence number/repetition number of noise detection cycle) exceeds a limit or not.

If the occurrence frequency does not exceed the limit, it is judged the magnetic head is a good product with respect to Barkhausen noise at step S4. Contrary to this, if the occurrence frequency exceeds the limit, it is judged the magnetic head is a defective product with respect to Barkhausen noise at step S5.

As aforementioned, according to this embodiment, inspection for Barkhausen noise is performed by a high-frequency measurement of the output of the magnetic head under application of a low-frequency external magnetic field from the Helmholtz coil 10 which can vary intensity of the applying magnetic field. By performing such high-frequency measurement, more precise inspection of Barkhausen noise than the normal Barkhausen inspection of measuring ρ-H characteristics can be expected as described hereinafter.

Figure 6A:
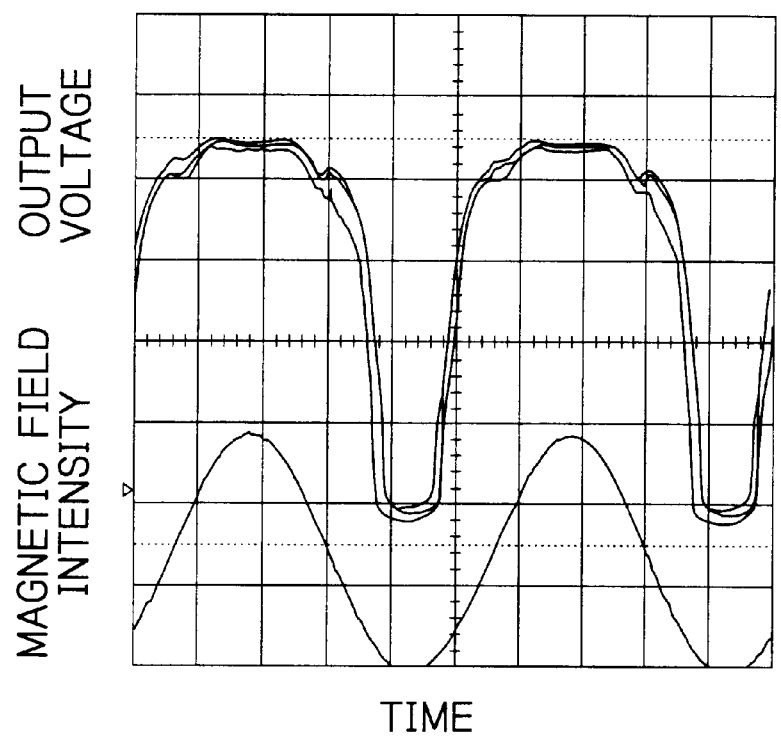
FIG. 6a is a graph of wave shapes of MR output voltage and applied external magnetic field obtained by executing a normal measurement of ρ-H characteristics for a MR read head element.
Figure 6B:
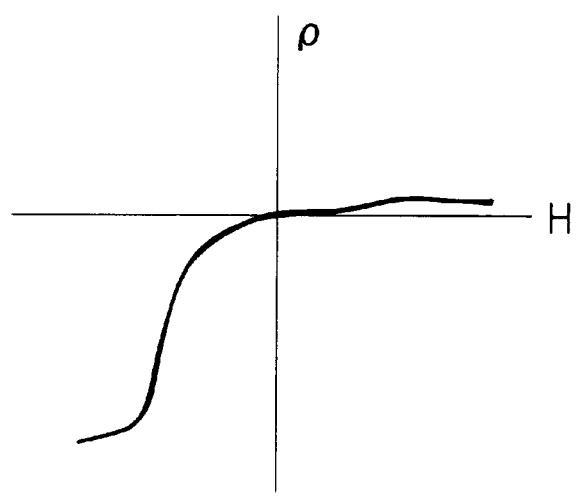
FIG. 6b is a graph of ρ-H loop obtained from the normal measurement of ρ-H characteristics.

FIG. 6a illustrates wave shapes of MR output voltage (upper wave form) and applied external magnetic field (lower wave form) obtained by executing a normal measurement of ρ-H characteristics for a sample of MR read head element, and FIG. 6b illustrates a ρ-H loop obtained from the normal measurement of ρ-H characteristics. As for the measurement conditions, the applied external magnetic field was 48,000 A/m (600 Oe) and 400 Hz, and the sense current was 5 mA. The MR output voltage was amplified by 1,000 times and the external magnetic field was amplified by 10 times. The band (cutoff) of the amplifier was 30 kHz. In FIG. 6a, the range of time indicated along the lateral axis is 0.5 ms, and the range of voltage indicated along the longitudinal axis is 2 V.

As long as observing FIGS. 6a and 6b, it will be guessed that this sample is a good product with respect to Barkhausen noise. However, if a Barkhausen noise inspection with high-frequency measurement according to this embodiment is executed with respect to the same sample, a different result can be obtained as shown in FIG. 7.

Figure 7:
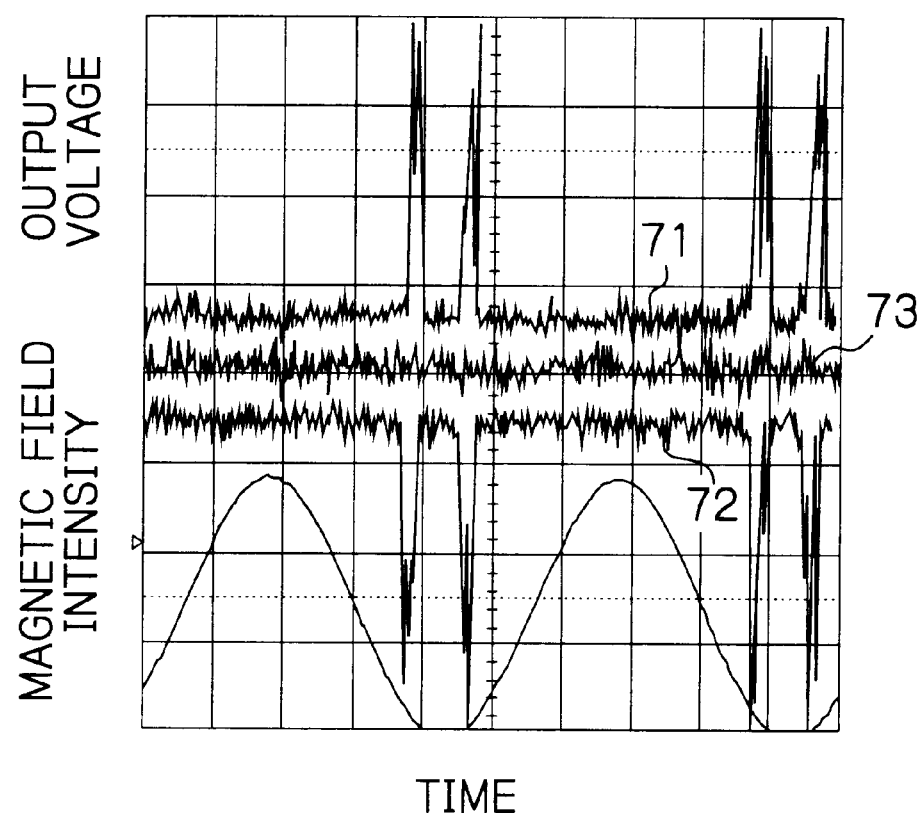
FIG. 7 is a graph of wave shapes of MR output voltage and applied external magnetic field obtained by executing a high-frequency measurement of ρ-H characteristics for the MR read head element according to the present invention.

FIG. 7 illustrates wave shapes of MR output voltage (upper wave form) and applied external magnetic field (lower wave form) obtained by executing a high-frequency measurement of ρ-H characteristics for the MR read head element according to this embodiment. In the figure, reference numerals 71 and 72 denote the maximum and minimum values of a high-frequency component signal at each time when the read-out operation is repeated predetermined times, and 73 a value of the high-frequency component signal at each time during the final readout operation. As for the measurement conditions, the applied external magnetic field was 48,000 A/m (600 Oe) and 400 Hz, and the sense current was 5 mA. The MR output voltage was amplified by 1,000 times and the external magnetic field was amplified by 10 times. The high pass filter has a cutoff frequency of 3 MHz and band (cutoff) of the amplifier was 180 MHz. In FIG. 7, the range of time indicated along the lateral axis is 0.5 ms, and the range of voltage indicated along the longitudinal axis is 2 V.

Although it is impossible to know from FIGS. 6a and 6b presented by the conventional art, it is possible to know from FIG. 7 according to this embodiment an occurrence of jump in the output voltage wave form due to Barkhausen noise around the applied external magnetic field of −20,000 A/m (−250 Oe).

Figure 8A:
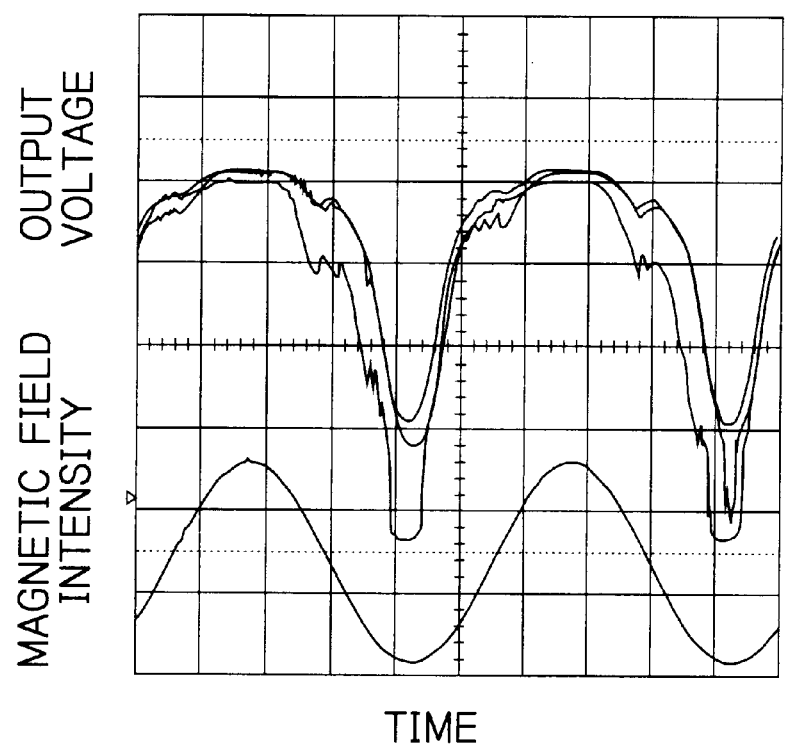
FIG. 8a is a graph of wave shapes of MR output voltage and applied external magnetic field obtained by applying different magnetic field from that of FIG. 6a during the normal measurement of ρ-H characteristics for the MR read head element.
Figure 8B:
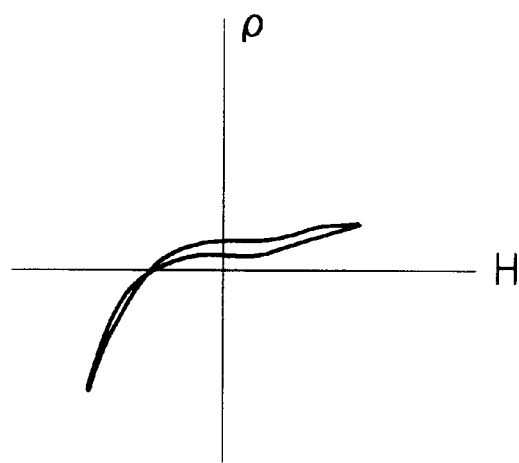
FIG. 8b is a graph of ρ-H loop obtained from the normal measurement of ρ-H characteristics.

For the same sample, the normal measurement of ρ-H characteristics was performed under application of external magnetic field of 20,000 A/m (250 Oe). Obtained wave shapes and ρ-H loop are shown in FIGS. 8a and 8b. FIG. 8a illustrates the wave shapes of MR output voltage (upper wave form) and applied external magnetic field (lower wave form), and FIG. 8b illustrates the ρ-H loop, obtained from the normal measurement of ρ-H characteristics. As for the measurement conditions, the applied external magnetic field was 20,000 A/m (250 Oe) and 400 Hz, and the sense current was 5 mA. The MR output voltage was amplified by 1,000 times and the external magnetic field was amplified by 10 times. The band (cutoff) of the amplifier was 30 kHz. In FIG. 8a, the range of time indicated along the lateral axis is 0.5 ms, and the range of voltage indicated along the longitudinal axis is 2 V.

Figure 9A:
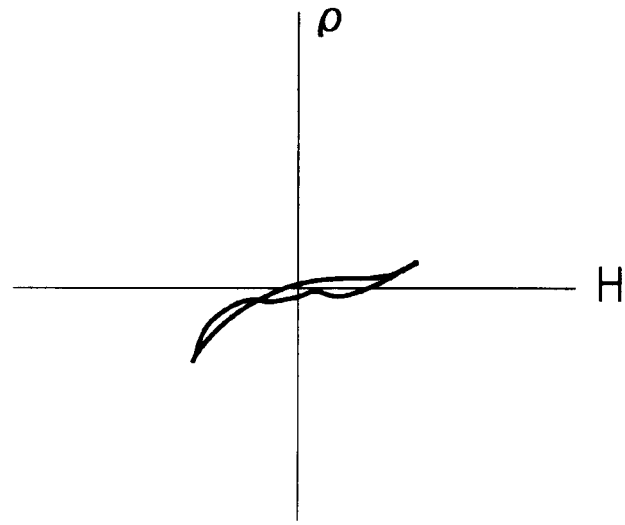
FIGS. 9a and 9b are graphs of ρ-H loop obtained by applying external magnetic field with different value form that of FIGS. 6a and 8b.
Figure 9B:
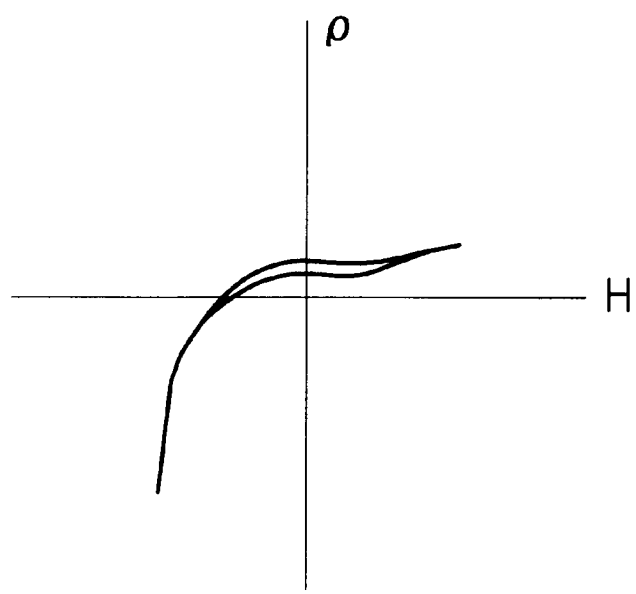

FIGS. 9a and 9b illustrate ρ-H loops obtained from the normal measurement of ρ-H characteristics under application of external magnetic field of 16,000 A/m (200 Oe) and 20,800 A/m (260 Oe), respectively.

FIG. 8a indicates that the MR output voltage wave shape is unstable near the negative peak of the applied magnetic field, and FIGS. 8b, 9a and 9b indicate that the area of the ρ-H loop is large or that ρ-H characteristics opens. Thus, from these figures, it is possible to assume that Barkhausen noise may occur when the applied external magnetic field is about these values.

As aforementioned, an occurrence of Barkhausen noise can be detected by executing the normal ρ-H characteristics measurement. However, since it is impossible to preliminarily know that what intensity of external magnetic field applied to the magnetic head will occur Barkhausen noise, a plurality of normal measurements of ρ-H characteristics under different magnetic field intensities must be executed. Thus, according to the conventional normal ρ-H characteristics measurement, not only measurement time increases but also great deal of manpower is required, and therefore it is completely unsuitable to practical use. Whereas, according to the high-frequency measurement of this embodiment, Barkhausen noise can be easily and reliably detected in a short time. Furthermore, the detection of Barkhausen noise can be performed without applying magnetic stress to the thin-film magnetic head.

Since the external magnetic field applied to the magnetic head is that generated by the Helmholtz coil 10, no thermal noise and media noise is contained as the external magnetic field from the magnetic record media and therefore correct detection of Barkhausen noise can be expected.

In detection of Barkhausen noise, it is very important to know not only the existence of the noise but also a magnetic field intensity at which the Barkhausen noise will occur. In this embodiment, since the Helmholtz coil 10 is used and therefore the external magnetic field intensity can be optionally adjusted, it is possible to also judge the safety when the magnetic head is assembled in the HDD.

Furthermore, as mentioned before, since the noise detection circuit 23 for performing the high-frequency measurement of Barkhausen noise is connected to the high-frequency output terminal of the head amplifier circuit 20 and also the ρ-H measurement circuit 22 is connected to the BHV output terminal of the head amplifier circuit 20, a high-frequency measurement and a low-frequency ρ-H measurement can be simultaneously executed. Therefore, a jumped amount of the Barkhausen noise can be obtained by performing a sequence of (1) confirming an occurrence of Barkhausen noise by high-frequency measurement, (2) finding an magnetic field intensity at which the Barkhausen noise occurred, (3) adjusting an intensity of magnetic field to be applied at the found magnetic field intensity, and (4) detecting a jumped amount or a jumped voltage value by a ρ-H characteristics measurement. As a result, it is possible to obtain a ratio of the jumped amount with respect to the head output (S/N), and it is also possible to acquire an index of what the jumped amount does the influence of at the time of use. The measured value of the ρ-H characteristics measurement may be referred for determining the aforementioned threshold voltages.

Figure 10:
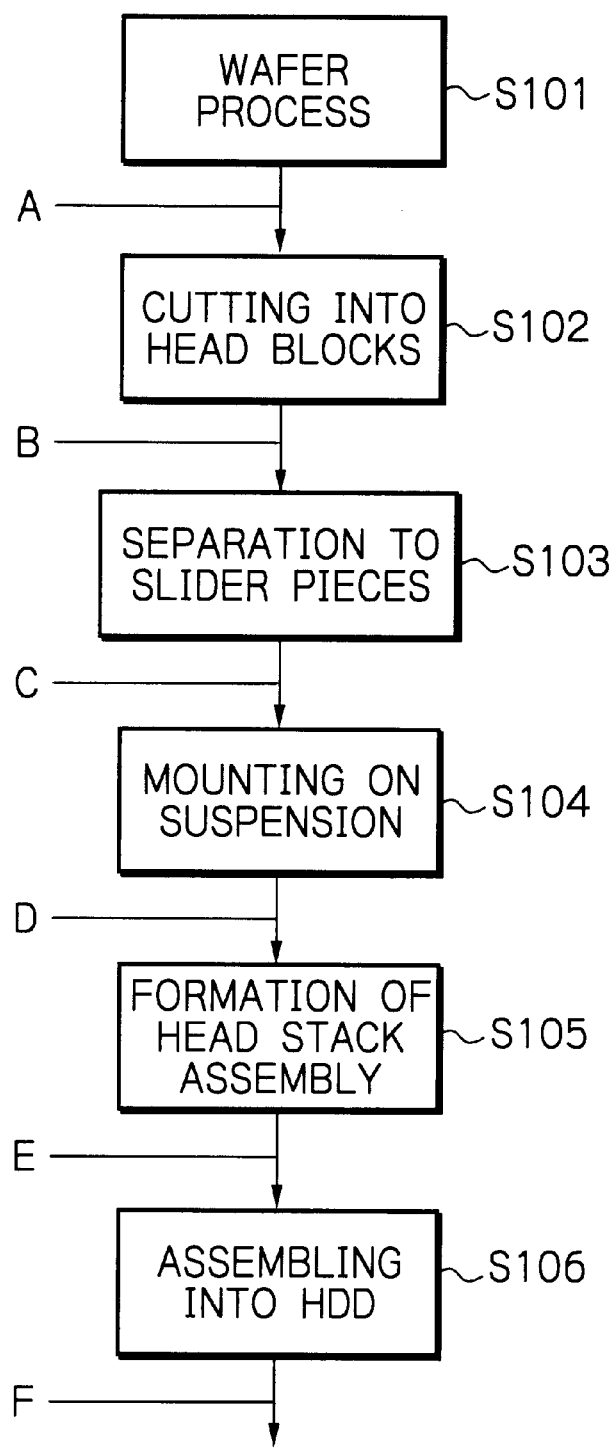
FIG. 10 is a process chart schematically illustrating process flow from fabrication of a thin-film magnetic head to its assembling into a HDD.

In general, fabrication of a thin-film magnetic head and assemble of the fabricated head into a HDD have processes schematically illustrated in FIG. 10.

First, at step S101, many thin-film magnetic heads are fabricated on a wafer in matrix arrangement. Then, at step S102, the wafer is cut into head blocks or bars each having a plurality of aligned thin-film magnetic heads. At the next step S103, each head block is individually separated to slider pieces of the thin-film heads. Thereafter, at step S104, the thin-film magnetic head is mounted on a suspension to form a head gimbal assembly. Then, at step S105, a plurality of head gimbal assemblies are mounted on a carriage to make a head stack assembly. Finally, the head stack assembly is assembled into a HDD at step S106.

In the aforementioned embodiment, the process of detecting Barkhausen noise of the thin-film magnetic head is performed after the step S102, namely at a point B shown in FIG. 10. However, according to the present invention, this noise detection process may be executed after the wafer process (point A), after the separation into the head blocks (point C), after the mounting the head on the suspension (point D), after the formation of the head stack assembly (point E), or after the assembling the head stack assembly into the HDD (point F).

FIG. 11 illustrates in detail a Barkhausen noise detection process in a control program in another embodiment according to the present invention. This noise detection process corresponds to the process shown in FIG. 5 in the already mentioned embodiment of FIG. 1.

In this embodiment, if the magnetic field intensity at which Barkhausen noise occurs is out of a magnetic field range normally produced in a HDD, this occurrence of the Barkhausen noise is not counted.

Namely, in this embodiment, if it is judged that the high-frequency component signal is out of the predetermined range at step S23 of FIG. 11, whether the magnetic field intensity at that time is out of a magnetic field range normally produced in a HDD or not is judged at step S27. Then, only if the magnetic field intensity at that time is within the normally produced magnetic field range in HDD, a trigger signal output from the AND circuit 235 is applied to the noise counter 236 and thus content of this counter is incremented by one at step S24. Whereas if the magnetic field intensity at that time is out of the normally produced magnetic field range in HDD, the program proceeds to step S25 without incrementing the content of the noise counter 236.

In the latter case, since this magnetic head cannot be specified that it will produce Barkhausen noise even under normal operation or under normal magnetic field, no counting of noise detection is executed at this time. It should be noted that such control is enabled because the control computer 12 knows the applied magnetic field to the magnetic head from the Helmholtz coil 10.

Other processes, operations and advantages in this embodiment are the same as those in the aforementioned embodiment.

In the aforementioned embodiments, the high-frequency component signal is compared with one upper threshold voltage and with one lower threshold voltage. However, the high-frequency component signal may be compared with a plurality of upper threshold voltages and with a plurality of lower threshold voltages. Thereby, it is possible to know how the occurred Barkhausen noise will affect the system.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for testing a thin-film magnetic head with a magnetoresistive effect read head element, said method comprising the steps of:

applying a low frequency or DC external magnetic field to said thin-film magnetic head from a stationary magnetic field generation means;

executing a high-frequency amplification of an output from said magnetoresistive effect read head element under the application of the external magnetic field to provide a high-frequency amplified signal;

deriving only a high-frequency component from said high-frequency amplified signal to provide a high-frequency component signal; and judging whether said thin-film magnetic head occurs a noise or not by using said high-frequency component signal.

2. The method as claimed in claim 1, wherein said judging step includes measuring the number of times that said high-frequency component signal exceeds a threshold.

3. The method as claimed in claim 1, wherein said method further comprises a step of obtaining an intensity of the external magnetic field applied from said stationary magnetic field generation means at a time when it is judged that said thin-film magnetic head occurs a noise.

4. The method as claimed in claim 3, wherein said method further comprises a step of ignoring the judged occurrence of noise when said obtained intensity of the external magnetic field is out of a normal magnetic field range.

5. The method as claimed in claim 1, wherein said method is performed for a plurality of thin-film magnetic head aligned on a head block.

6. An apparatus for testing a thin-film magnetic head with a magnetoresistive effect read head element, comprising:

a stationary magnetic field generation means for applying a low frequency or DC external magnetic field to said thin-film magnetic head;

a high-frequency amplification means for amplifying an output from said magnetoresistive effect read head element under the application of the external magnetic field to provide a high-frequency amplified signal;

a high-pass means for deriving only a high-frequency component from said high-frequency amplified signal to provide a high-frequency component signal; and a judgment means for judging whether said thin-film magnetic head occurs a noise or not by using said high-frequency component signal.

7. The apparatus as claimed in claim 6, wherein said judgment means comprises a comparison means for detecting that said high-frequency component signal exceeds a threshold to provide an output when detected, and means for counting the number of the output provided from said comparison means.

8. The apparatus as claimed in claim 6, wherein said stationary magnetic field generation means comprises means for generating an alternating magnetic field with an intensity that corresponds to a level of an applied alternating current.

* * * * *